United States Patent
Lee et al.

(10) Patent No.: US 10,992,772 B2
(45) Date of Patent: Apr. 27, 2021

(54) AUTOMATICALLY RELATING CONTENT TO PEOPLE

(71) Applicant: Microsoft Technology Licensing, LLC, Redmond, WA (US)

(72) Inventors: Welly Sugiarto Lee, Redmond, WA (US); Dmitriy Meyerzon, Bellevue, WA (US); Paula A. Wing, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 14/854,604

(22) Filed: Sep. 15, 2015

(65) Prior Publication Data

US 2016/0323411 A1 Nov. 3, 2016

Related U.S. Application Data

(60) Provisional application No. 62/155,957, filed on May 1, 2015.

(51) Int. Cl.
*H04L 29/08* (2006.01)
*G06Q 50/00* (2012.01)
*G06Q 10/10* (2012.01)
*G09B 29/00* (2006.01)
*H04L 12/58* (2006.01)

(52) U.S. Cl.
CPC ......... *H04L 67/306* (2013.01); *G06Q 10/103* (2013.01); *G06Q 50/01* (2013.01); *G09B 29/00* (2013.01); *H04L 51/04* (2013.01); *H04L 67/22* (2013.01)

(58) Field of Classification Search
CPC ....... H04L 67/306; H04L 51/04; H04L 67/22; G06Q 10/103; G06Q 50/01; G09B 29/00
USPC ....................................................... 709/205
See application file for complete search history.

(56) References Cited

U.S. PATENT DOCUMENTS

| | | | |
|---|---|---|---|
| 7,707,167 B2 | 4/2010 | Kishore et al. | |
| 7,865,457 B2 | 1/2011 | Ravin et al. | |
| 8,312,097 B1 | 11/2012 | Siegel et al. | |
| 8,433,660 B2 | 4/2013 | Stern et al. | |

(Continued)

FOREIGN PATENT DOCUMENTS

| | | |
|---|---|---|
| CN | 102722781 A | 10/2012 |
| CN | 103902637 A | 7/2014 |

(Continued)

OTHER PUBLICATIONS

International Search Report and Written Opinion for International Patent Application No. PCT/US2016/029913, dated Jul. 29, 2016, date of filing: Apr. 29, 2016, 12 pages.

(Continued)

*Primary Examiner* — Umar Cheema
*Assistant Examiner* — Tony Williams
(74) *Attorney, Agent, or Firm* — Christopher J. Volkmann; Kelly, Holt & Christenson, PLLC

(57) ABSTRACT

A user associates other users or content with a representation of a topic area, in a computing system. Profile associations between users and the topic areas are generated by detecting that users are associated with the topic areas, or that users have added content to the topic areas. User profile information is automatically updated based upon the profile associations generated.

14 Claims, 13 Drawing Sheets

(56) References Cited

U.S. PATENT DOCUMENTS

| | | | |
|---|---|---|---|
| 8,538,960 B2 | 9/2013 | Wong et al. | |
| 8,577,834 B2 | 11/2013 | Chen et al. | |
| 8,805,844 B2 | 8/2014 | Schorzman et al. | |
| 2004/0073443 A1 | 4/2004 | Gabrick et al. | |
| 2006/0184617 A1* | 8/2006 | Nicholas | G06Q 30/02 709/203 |
| 2006/0200434 A1* | 9/2006 | Flinn | G06N 99/005 706/12 |
| 2007/0162432 A1* | 7/2007 | Armstrong | G06Q 10/107 |
| 2009/0077062 A1* | 3/2009 | Spivack | G06Q 30/02 |
| 2010/0268574 A1* | 10/2010 | Butcher | G06Q 10/10 705/14.53 |
| 2011/0041082 A1* | 2/2011 | Nguyen | G06Q 10/10 715/752 |
| 2011/0252121 A1* | 10/2011 | Borgs | G06Q 10/10 709/223 |
| 2013/0013592 A1 | 1/2013 | Narvekar et al. | |
| 2013/0066866 A1* | 3/2013 | Chan | G06F 17/30699 707/732 |
| 2013/0091104 A1* | 4/2013 | Kemp | G06F 16/23 707/692 |
| 2013/0246327 A1 | 9/2013 | Tabrizi | |
| 2013/0263020 A1* | 10/2013 | Heiferman | H04L 51/32 715/753 |
| 2013/0318156 A1 | 11/2013 | Friedman et al. | |
| 2014/0025692 A1* | 1/2014 | Pappas | G06F 17/30 707/754 |
| 2014/0136521 A1* | 5/2014 | Pappas | G06Q 50/01 707/722 |
| 2014/0181195 A1* | 6/2014 | Sullivan | H04L 63/0421 709/204 |
| 2014/0222702 A1 | 8/2014 | Jennings | |
| 2014/0282098 A1* | 9/2014 | McConnell | G06Q 10/105 715/753 |
| 2014/0324913 A1 | 10/2014 | Morris et al. | |
| 2014/0325407 A1 | 10/2014 | Morris et al. | |
| 2014/0330773 A1 | 11/2014 | Brillhart et al. | |
| 2014/0337160 A1 | 11/2014 | Jin et al. | |
| 2014/0344265 A1* | 11/2014 | Boucher | G06F 16/2423 707/732 |
| 2014/0344718 A1* | 11/2014 | Rapaport | H04L 51/32 715/753 |

FOREIGN PATENT DOCUMENTS

| | | |
|---|---|---|
| CN | 104094220 A | 10/2014 |
| CN | 104239385 A | 12/2014 |
| WO | 2001035272 A3 | 5/2001 |
| WO | 2014089672 A1 | 6/2014 |

OTHER PUBLICATIONS

Vermeiren, et al,, "Ways How LinkedIn Helps to Find Experts Outside and Inside Your Own Organization", Published on: Apr. 19, 2012, Available at: http://www.how-to-really-use-linkedin.com/linkedin-tips/12-ways-how-linkedin-helps-to-find-experts-outside-and-inside-your-own-organization/.

"Yammer Full Feature List", Published on: Sep. 9, 2013, Available at: https://about.yammer.com/product/feature-list/.

"First Office Action issued in Chile Patent Appilcation No. 02702-2017", dated Oct. 22, 2016, 5 Pages.

"Office Action Issued in Colombian Patent Application No. NC2017/0010838", dated Jun. 6, 2018, 25 Pages.

"Office Action Issued in Colombian Patent Application No. NC2017/0010838", dated Apr. 20, 2019, 22 Pages.

"Office Action Issued in Chilean Patent Application No. 02702-2017", dated Feb. 14, 2019, 7 Pages.

"Office Acton Issued in Eulinpeari Patent Application No. 16725637.9"; dated Mar. 25, 2019, 6 Pages.

"Office Action issued in Chile Patent Application No. 02702-2017" dated Nov. 25, 2019, 3 Pages.

"Office Action Issued in Israel Patent Application No. 254846", dated Nov. 20, 2019, 1 Page. (W/o English Translation).

"Office Action Issued in Indonesian Patent Application No. P00201707800", dated Jul. 19, 2019, 3 Pages.

"First Office Action and Search Report Issued in Chinese Patent Application No. 201680025328.6", dated Mar. 16, 2020, 13 Pages.

"Office Action Issued in Colombian Patent Application No. NC2017/0010838", dated Jul. 27, 2020, 25 Pages.

"Second Office Action Issued in Chinese Patent Application No. 201680025328.6", dated Oct. 10, 2020, 16 Pages.

\* cited by examiner

AUTOMATICALLY RELATING CONTENT TO PEOPLE

CROSS-REFERENCE TO RELATED APPLICATION

The present application is based on and claims the benefit of U.S. provisional patent application Ser. No. 62/155,957, filed May 1, 2015, the content of which is hereby incorporated by reference in its entirety.

BACKGROUND

Computer systems are currently in wide use. Many organizations use computer systems in order to help facilitate performing tasks, processes, workflows, etc.

The organizations that use computer systems may include very large, multi-national, organizations, that have tens of thousands of employees. They may also include relatively local organizations that may have a very small number of employees. Regardless of the size of the organization, it can be helpful for the persons in the organization to have information about one another.

Therefore, some computer systems maintain a store of profile information corresponding to the individual persons at the organization. The persons normally update their own profile information to identify topic areas for which they have particular knowledge. Such computer systems may have search systems that allow a given user to perform a search through the profile information to identify people that have knowledge of a particular topic.

However, some organizations have no such profile data. In addition, many such systems rely on the persons, themselves, to maintain and update their own profile information. This can make it very difficult for people to identify others in the organization that have particular knowledge. In addition, it can result in a performance degradation of the computing system itself, because users may need to launch numerous queries against the computer system in an attempt to find the desired people. This can increase network traffic and consume computing and memory overhead.

The discussion above is merely provided for general background information and is not intended to be used as an aid in determining the scope of the claimed subject matter.

SUMMARY

A user associates other users or content with a representation of a topic area, in a computing system. Profile associations between users and the topic areas are generated by detecting that users are associated with the topic areas, or that users have added content to the topic areas. User profile information is automatically updated based upon the profile associations generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
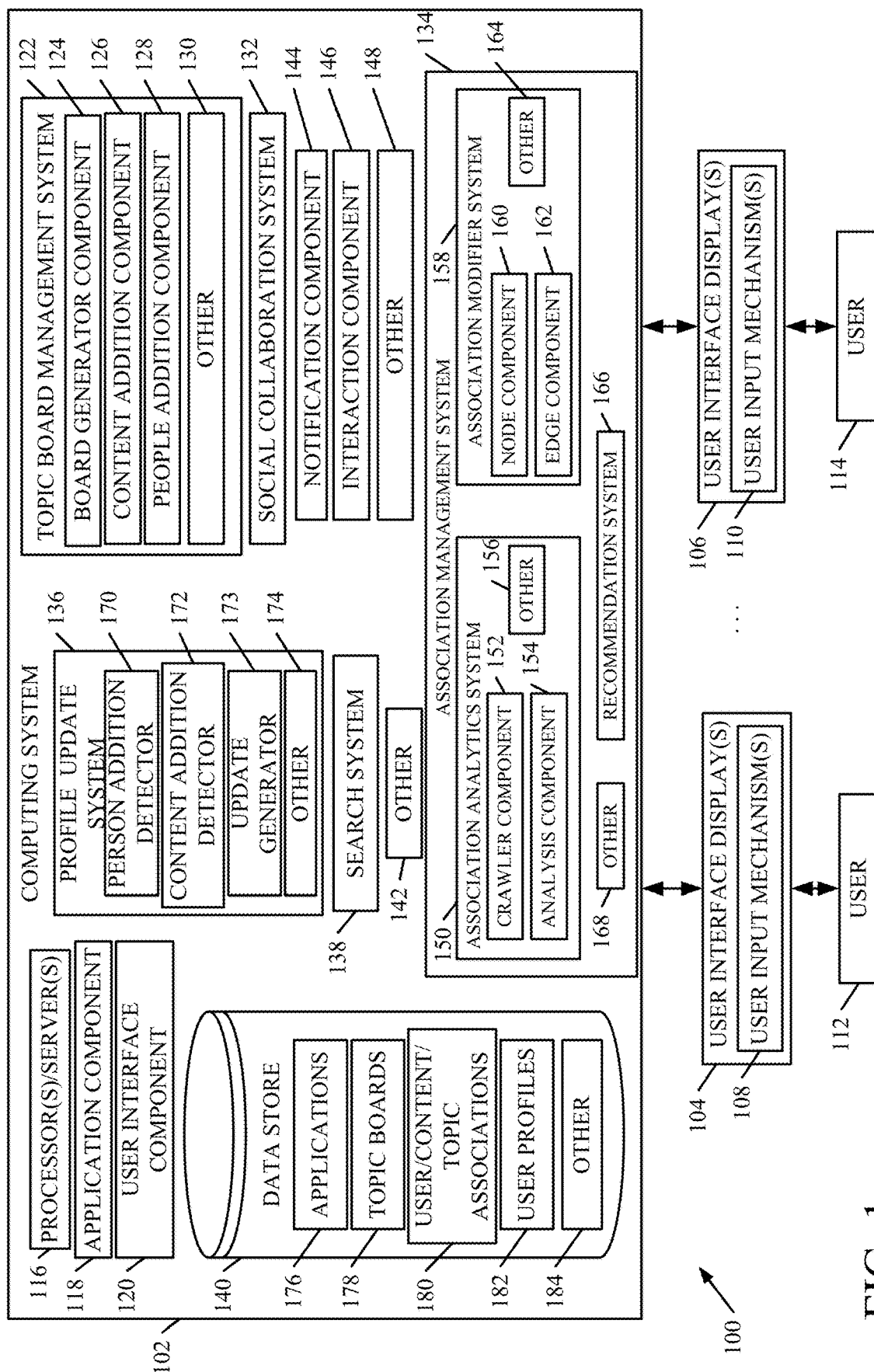
FIG. 1 is a block diagram of one example of a computing system architecture.

FIG. 1 is a block diagram of one example of a computing system architecture 100. Architecture 100 illustratively includes computing system 102 that generates user interface displays 104-106, with user input mechanisms 108-110 for users 112-114. Users 112-114 illustratively interact with user input mechanisms 108-110 to control and manipulate computing system 102.

Computing system 102, itself, illustratively includes processors or servers 116, application component 118, user interface component 120, topic board management system 122 (which, itself, includes board generator component 124, content addition component 126, people addition component 128, and it can include other items 130), social collaboration system 132, association management system 134, profile update system 136, search system 138, data store 140, and it can include other items 142. Social configuration system 132 illustratively includes notification component 144, interaction component 146, and it can include other items 148. Association analytics system 150 can include crawler component 152, analysis component 154, and it can include other items 156. System 134 can also include association modifier system 158, which can include node component 160, edge component 162, and it can include other items 164. System 134 can further include recommendation system 166 and other items 168. Profile update system 136 illustratively includes person addition detector 170, content addition detector 172, update generator 173, and it can include other items 174. Data store 140 illustratively includes applications 176, topic boards 178, user/topic associations 180, user profiles 182, and it can include a wide variety of other information 184. Before describing the operation of profile update system 136 in more detail, an overview of some of the items in computing system 102, and their operation, will first be provided.

Application component 118 illustratively runs applications 176. Applications 176 can include a wide variety of different types of applications, such as communication applications (e.g., email systems, etc.), document management systems, scheduling and meeting systems, project management systems, among a wide variety of others. User interface component 120, either itself or under control of other items in computing system 102, illustratively generates the user interface displays 104-106 with the user input mechanisms 108-110. This allows users 112-114 to interact with the applications 176, as they are being run by application component 120. Topic board management system 122 illustratively allows users to manage topic boards 178 in computing system 102. Topic boards 178 are illustratively a representation of a topic in a location, and using a representation mechanism, such that content and people can be associated with the topic as well. Therefore, board generator component 124 illustratively generates user interface displays with user input mechanisms that allow users to create or delete a topic board 178. Content addition component 126 and people addition component 128 illustratively generate user input mechanisms that allow users to associate people and content (or disassociate them) with the topic boards 178.

Notification component 144 in social collaboration system 132 illustratively notifies people who are currently associated with a topic board, when other people or content are added to the topic board. Interaction component 146 allows those users to perform social monitoring with respect to the content and people added to a topic board. Therefore, interaction system 146 may allow users to remove people or content from the topic board, through social collaboration system 132 (which may interact with topic board management system 122). This provides a social monitoring aspect which helps to ensure the quality of the associations between a given topic board 178 and the people and content associated with it.

Association management system 134 illustratively manages the associations between people and content, and corresponding topic boards 178 so that they can be searched, traversed, retrieved, etc. In one example, the associations are maintained as a node edge graph in which people, documents (or other items of content), topic boards 178, etc., are stored as nodes in the graph and the associations are stored as directed edges that connect the nodes in the graph. Regardless of how they are stored, association management system 134 illustratively stores the user/content/topic associations 180 in data store 140.

Association analytics system 150 can use crawler component 152 to crawl and parse the associations. It can also use analysis component 154 to analyze the associations to generate various metrics indicative of the associations. Association modifier system 158 illustratively generates the data structures that are used to track the associations. For instance, where the associations 180 are stored as a node edge graph, node component 160 illustratively generates nodes in the graph corresponding to documents, users, topic boards, etc. Edge component 162 generates edges between those nodes, based upon a user being added to a topic board, an item of content being added to a topic board, etc.

Recommendation system 166 can generate recommendations of other people or content that can be added to a topic board 178, based upon the current associations 180. For instance, where the associations 180 are stored as a node edge graph, recommendation system 166 can traverse the edges in the graph (e.g., by performing transitive closures of paths within the graph) to generate recommendations that can be surfaced for user interaction.

Figure 1A:
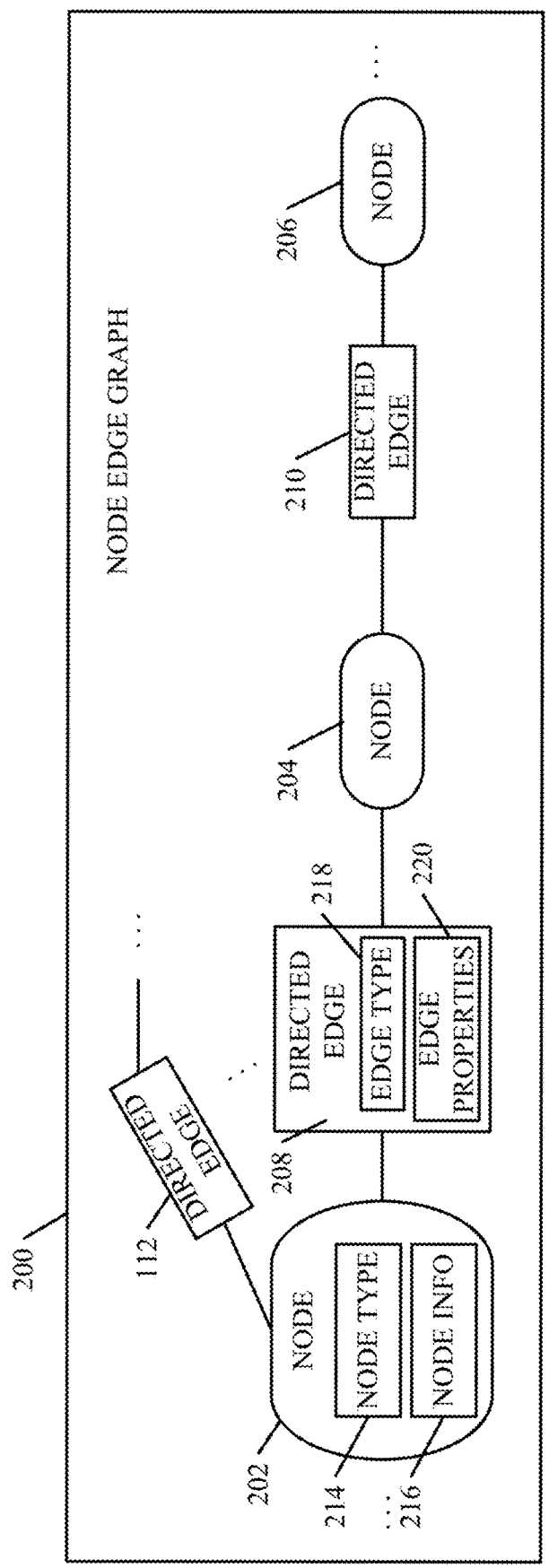
FIGS. 1A and 1B show examples of portions of a node edge graph.
Figure 1B:
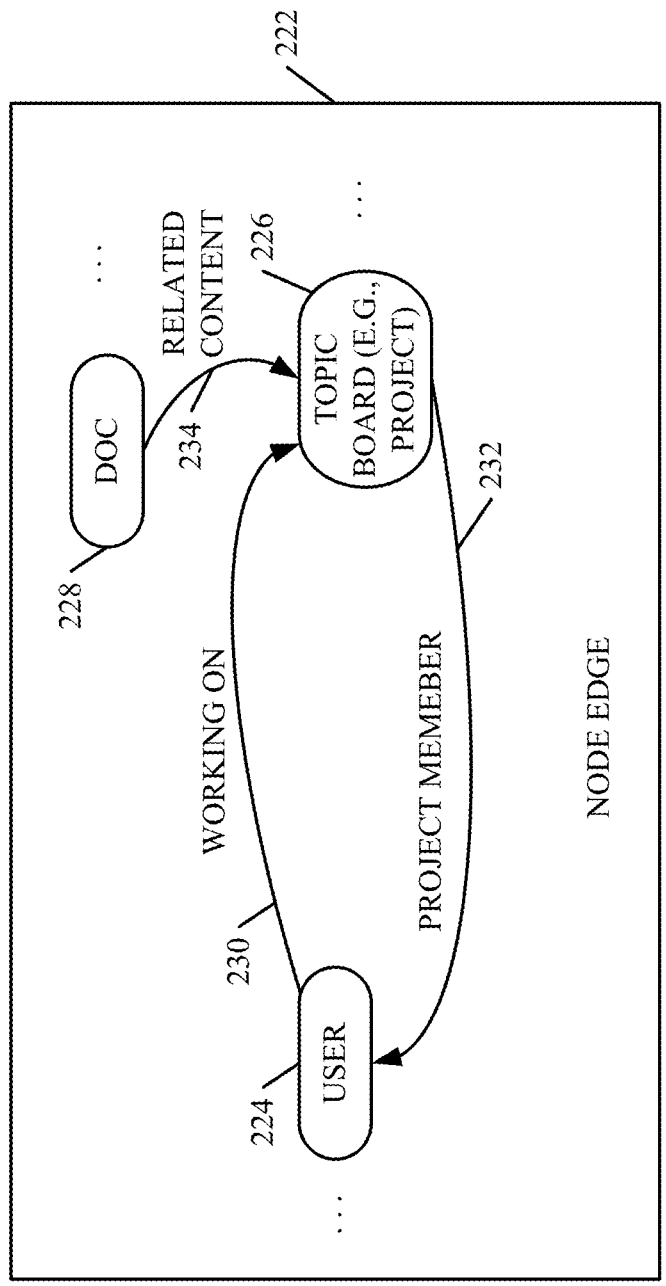

Before proceeding with the overview, FIGS. 1A and 1B will be discussed. FIGS. 1A and 1B show examples of a node edge graph that can be used to represent user/content/topic associations 180. In the example shown in FIG. 1A, node edge graph 200 illustratively includes a set of nodes 202, 204 and 206. Each node can represent a person, an item of content (e.g., a document), a topic board, etc. The nodes 202-206 are illustratively connected to one another and other nodes within graph 200, by directed edges 208, 210 and 212.

Each node illustratively has a node type 214 and node information 216. The node type can identify the type of node (e.g., a document node, a topic board node, a person node, etc.) and node information 216 can include a set of properties that more specifically identify the node. For instance, the properties can identify the particular user, the particular document and its properties, the particular topic board, etc. Each directed edge also illustratively includes an edge type identifier 218, and a set of edge properties 220. Again, the edge type identifier 218 can identify a type of edge. For instance, where the two connected nodes are a person and a topic board, respectively, the topic board may represent a project, in which case the directed edge connecting those two nodes may be a "working on" edge that indicates that the user represented by the first node is working on the project represented by the second node. Of course, these are examples only.

FIG. 1B shows another, more concrete, example of a portion of a node edge graph 222. Graph 222 illustratively includes a user node 224 that identifies a user, a topic board (e.g., project) node 226 that identifies a project and a document node 228 that represents a document. User 224 is connected to topic board node 226 by working on edge 230 and project member edge 232. Thus, edge 230 indicates that user 224 is working on the project represented by topic board 226. Edge 232 indicates that user 224 is a project member in the project represented by topic board 226. Graph 222 also shows that document 228 is related to topic board 226 as related content. This is indicated by edge 234.

Again, it will be appreciated that associations between documents, users and topics (e.g., projects) can be maintained in a wide variety of different ways. Maintaining those associations as a node edge graph as shown in FIGS. 1A and 1B is only one example.

Figure 2:
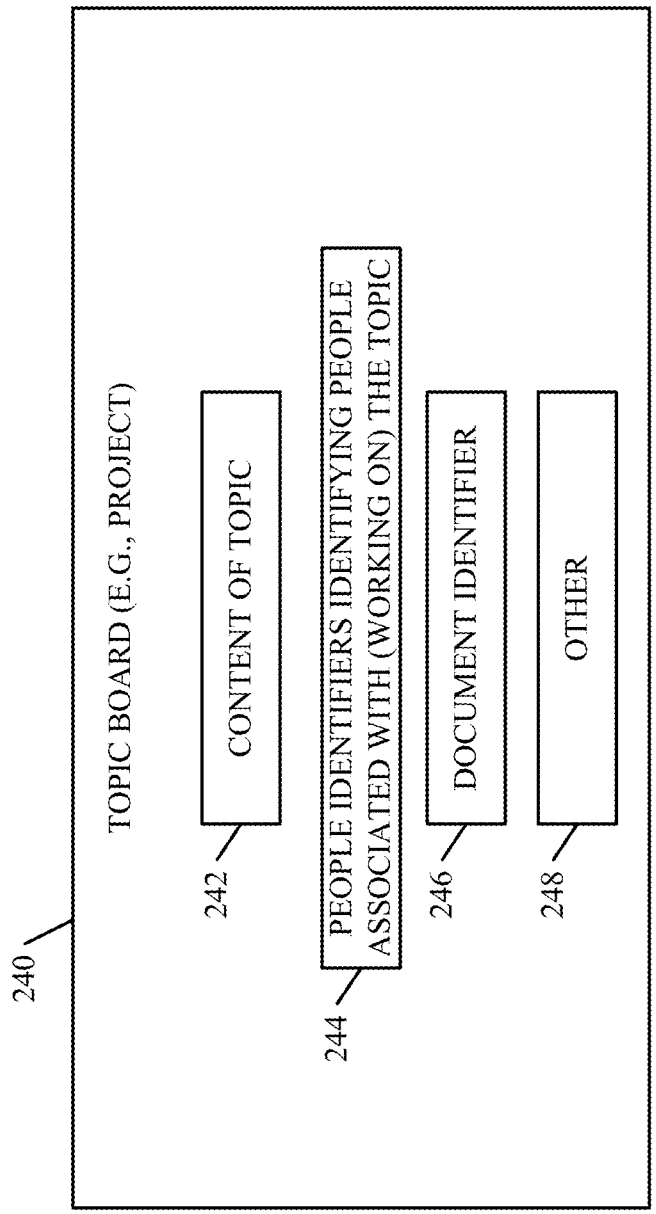
FIG. 2 is a block diagram of one example of a topic board.

FIG. 2 is a block diagram of one example of a topic board 240. Topic board 240 may be a webpage or another site or data structure that represents a topic. It can include descriptive content 242 that identifies the topic. It can include a set of people identifiers identifying people associated with (or working with) the topic as indicated by block 244. It can include a set of document identifiers 246 that identify documents associated with the topic, and it can include a wide variety of other information 248.

Referring again to FIG. 1, and continuing with the overview discussion, profile update system 136 illustratively uses person addition detector 170 to detect when a user has added a person to a topic board using topic management system 122. Content addition detector 172 detects when a user has added content to a topic board. Update generator 173 then generates profile updates based upon the detected additions. For instance, where a person has been added to a topic board, update generator 178 generates a profile update for that person, indicating that the person is knowledgeable in the subject matter area corresponding to the topic board. Where a person adds a document (or other content) to a topic board, update generator 173 also generates a profile update for the person who added the document, indicating that such person is also knowledgeable about the topic area corresponding to the topic board. It then adds those updates to user profiles 182, for the corresponding users.

Figure 3:
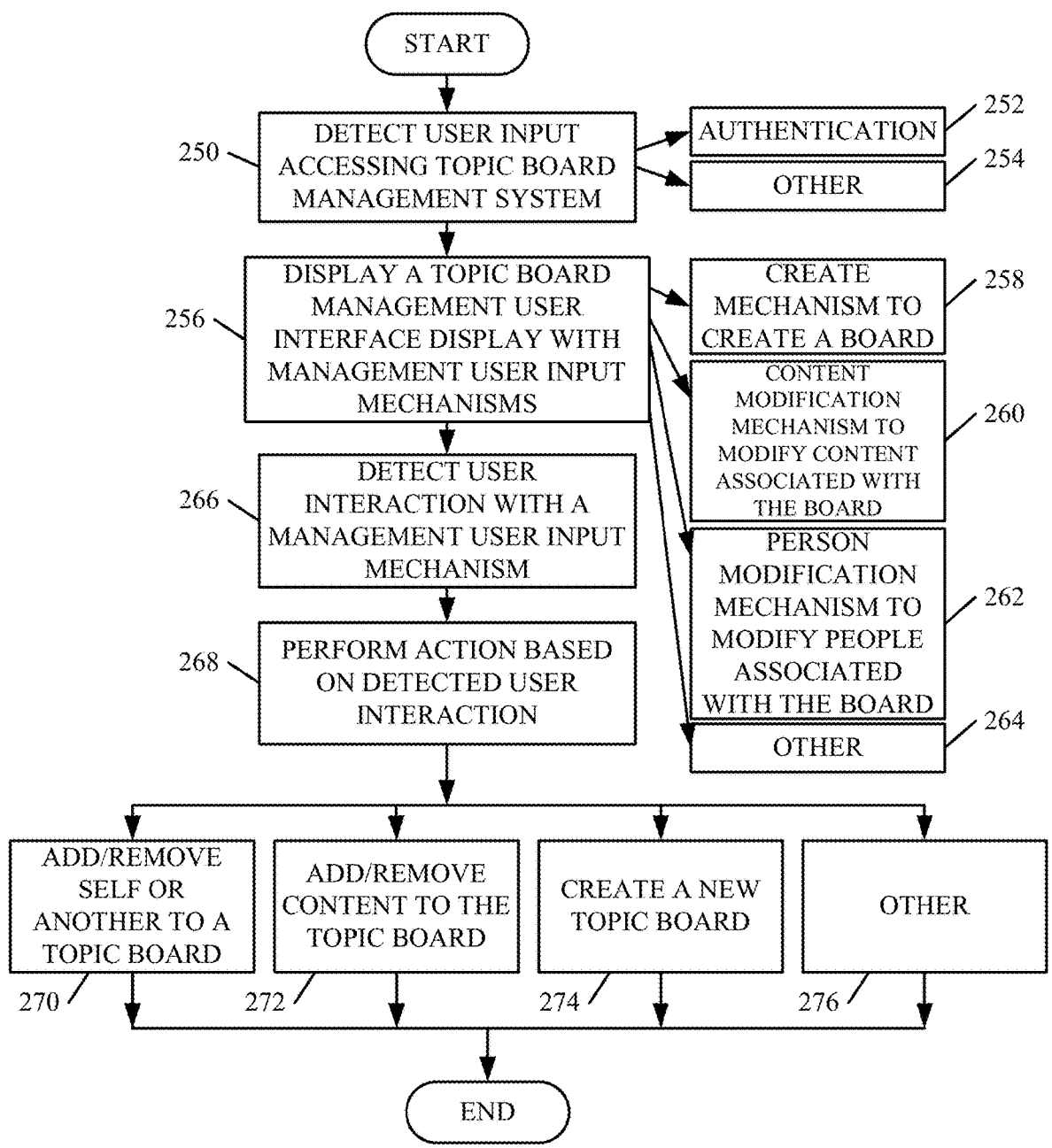
FIG. 3 is a flow diagram illustrating one example of the operation of a topic board management system in adding or removing content or people relative to a topic board.

FIG. 3 is a flow diagram illustrating one example of the operation of topic board management system 122, in more detail. System 122 first detects a user input indicating that the user wishes to access the topic board management system 122. This is indicated by block 250 in the flow diagram of FIG. 3. This can include the user entering authentication information 252 or a wide variety of other user inputs or user interactions 254.

System 122 then displays a topic board management user interface display with management user input mechanisms. This is indicated by block 256. The input mechanisms can include a create mechanism 258 that is used to create or delete a topic board. They can include content modification mechanisms 260 that can be used to add or delete content from the topic board, or to associate or disassociate documents relative to the content board. They can also include person modification mechanisms 262 that can be actuated to add people to a topic board, or delete them from a topic board. They can include a wide variety of other user input mechanisms 264, as well.

The particular component 124-128 in topic board management system 122 that generated a user input mechanism, then detects user interaction with one of those user input mechanisms. This is indicated by block 266. For instance, people addition component 128 illustratively generates the user input mechanism that allows a user to add or delete people from a topic board. When the user interacts with (e.g., actuates) that user input mechanism, then component 128 detects this. The same is true of other components 124-126.

Topic board management system 122 then performs an action based upon the detected user interaction with the user input mechanisms. This is indicated by block 268. For instance, when the user has actuated an input mechanism to add or remove either themselves or another user relative to a topic board, system 122 performs that action by adding or removing the identified person relative to the topic board. This is indicated by block 270. Where the user has actuated a user input mechanism to add or remove content, that content is added or removed relative to the topic board. This is indicated by block 272. Where the user has actuated a user input mechanism to create or delete a topic board, this is performed as well. This is indicated by block 274. Where the user has actuated another user input mechanism, other actions can be performed. This is indicated by block 256.

Figure 4:
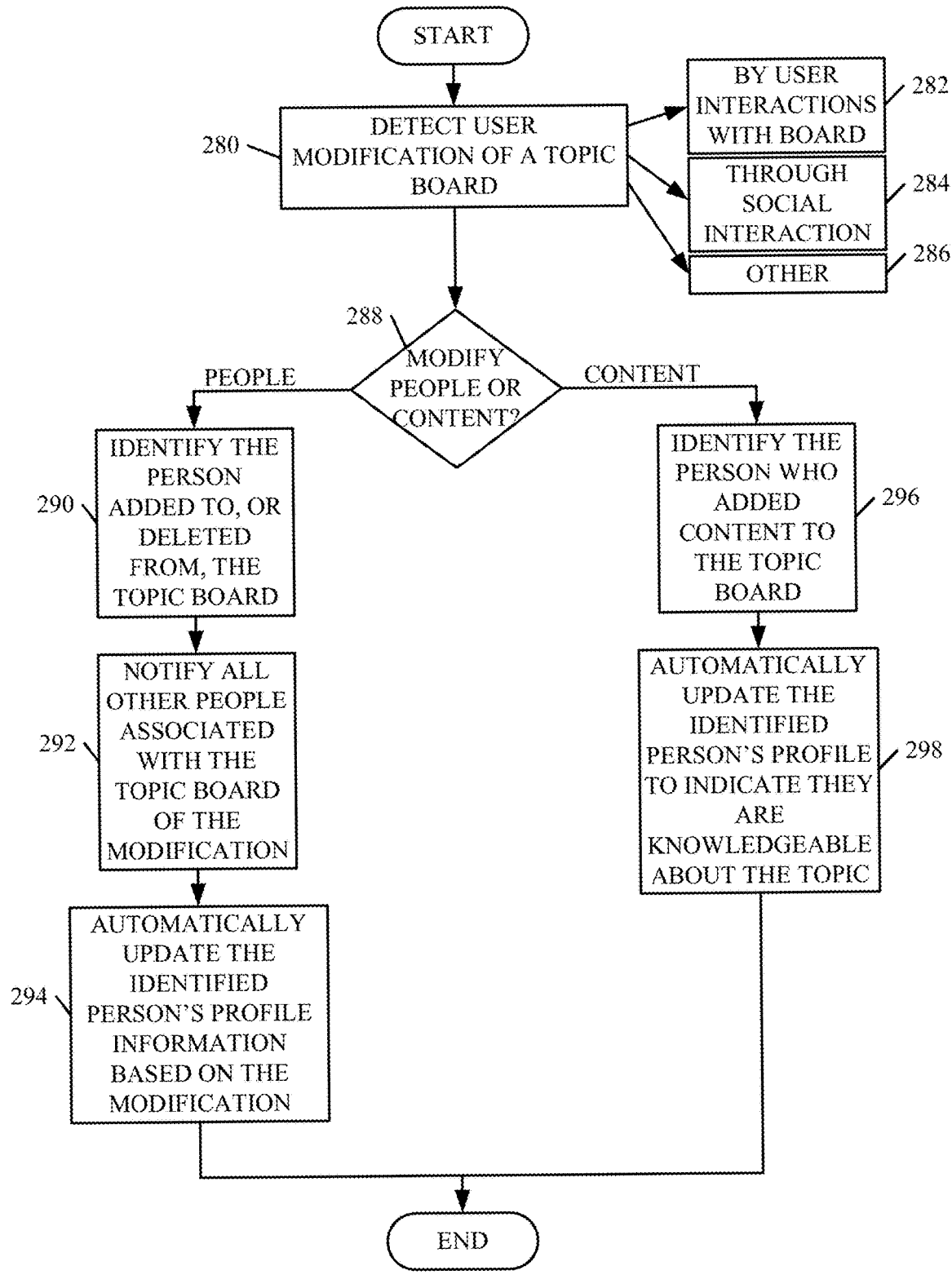
FIG. 4 is a flow diagram illustrating one example of the operation of a profile update system in automatically modifying profile information.

FIG. 4 is a flow diagram illustrating one example of the operation of profile update system 136. In one example, it first detects user modification of a topic board. This is indicated by block 280. For instance, it can detect this by receiving an indication from topic board management system 122 that a user has interacted with a topic board. This is indicated by block 282. It can also detect this by receiving an indication from social collaboration system 132 that a user has added or removed an individual or content from a topic board. This is indicated by block 284. It can detect this in other ways as well, as indicated by block 286.

System 136 then determines whether the modification was with respect to people or content. This is indicated by block 288. For instance, person addition detector 170 illustratively detects that a person has been added to, or removed from, a topic board. Content addition detector 172 illustratively detects when content has been added to, or removed from, a topic board.

If, at block 288, it is determined that a person has been added to, or deleted from, a topic board, then person addition detector 170 identifies the person that was added to or deleted from the topic board. This is indicated by block 290. It then accesses association 180 to identify all other people associated with that topic board, and generates a notification (e.g., using notification component 144 in social collaboration system 132, or otherwise) notifying all of the other people associated with the topic board that a person has been added to, or removed from, the topic board. This is indicated by block 292.

Update generator 173 then automatically generates a profile update indicating that the identified person (who has been added to, or removed from, the topic board) has knowledge about the subject matter of the topic board. It then automatically updates that user's profile information 182 to reflect the modification. For instance, where a person has been added to a topic board, then update generator 173 updates that person's profile information indicating that they are knowledgeable about the subject matter represented by the topic board. Where a person has been deleted from a topic board, then it updates that person's profile to remove the indication that the person is knowledgeable about that topic area. Automatically updating user profiles 182 is indicated by block 294.

If, at block 288, it is determined that content has been added to, or removed from, a topic board, this is detected by content addition detector 172. Detector 172 then identifies the particular user who added or removed the content from the topic board. This is indicated by block 296. Because a person is modifying content on a topic board, this can indicate that the person has a relatively high degree of knowledge with respect to the subject matter of that topic board. Therefore, update generator 173 automatically generates a profile update for that person, to indicate that they are knowledgeable about the topic. This is indicated by block 298. It thus updates the user profiles 182 to indicate this.

Figure 5:
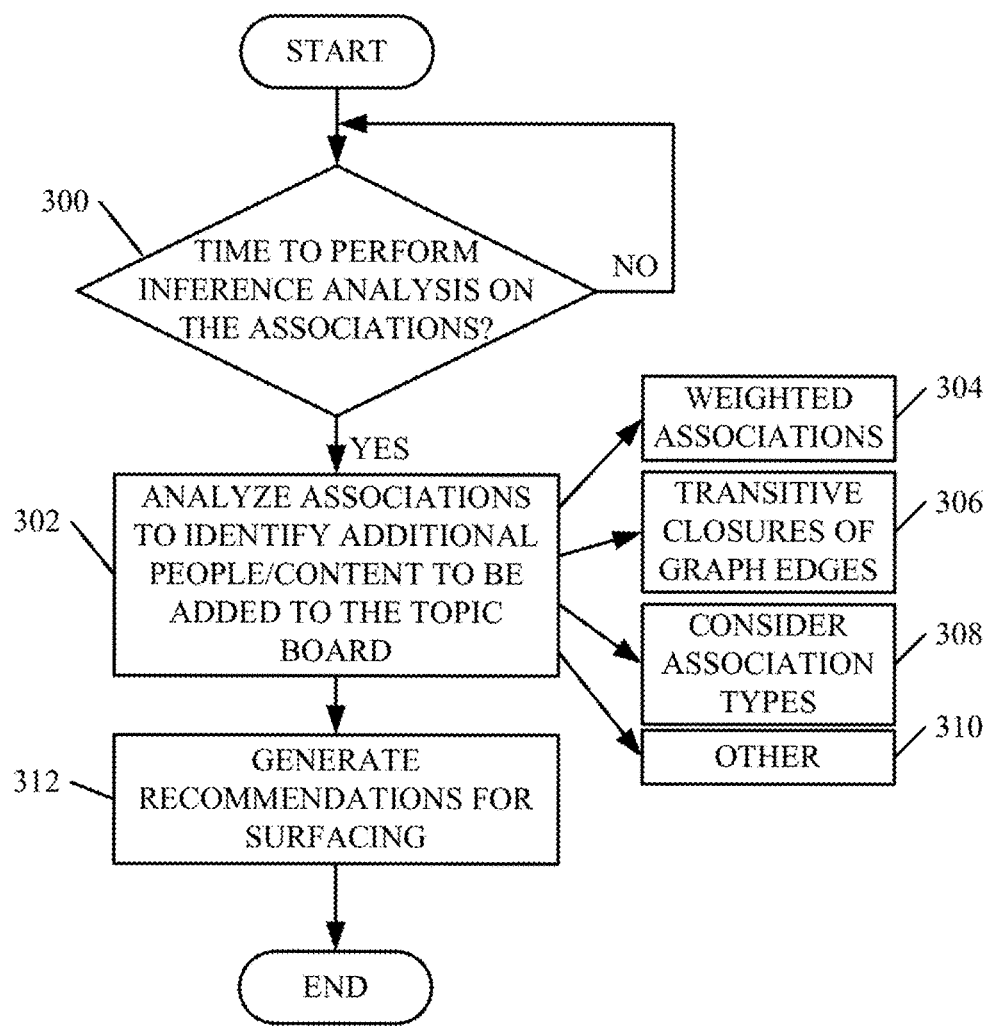
FIG. 5 is a flow diagram illustrating one example of the operation of a recommendation system.

FIG. 5 is a flow diagram illustrating one example of the operation of recommendation system 166. In one example, system 166 intermittently uses association analytics system 150 to analyze newly added or modified items in the user/content/topic associations 180. For instance, when the associations 180 are represented as a node edge graph, it intermittently analyzes new or modified nodes and edges in the graph. It can do this on a periodic basis, or based on a trigger indicative of a volume of modifications to the graph, or in a wide variety of other ways. Determining whether it is time to perform the analysis is indicated by block 300 in FIG. 5.

When it is time to perform the analysis, analytics system 150 illustratively crawls the graph or associations and identifies additional people or content that may be added to a given topic board, based upon the current associations. This is indicated by block 302. This can be done in a wide variety of different ways. For instance, the associations among people, topics and content or documents can be weighted to indicate a relative strength of the association. Those weights can be used in identifying other people or content that should be associated with a topic board. This is indicated by block 304. As an example, assume that John Doe and Jane Q both work on the same project. Assume that this is represented in the node edge graph. Assume also, however, that John Doe has authored a document. This may be evidence that the document should also be related to the project in the node edge graph. This is only one example.

The recommendation system can use analytics system 150 to identify additional people or content by performing transitive closures of graph edges within the node edge graph. This is indicated by block 306. It can do so by considering the types of associations (or edges) between the people, content, and topics. This is indicated by block 308. It can identify additional people or content to be added to a topic board in a wide variety of other ways as well, and this is indicated by block 310.

Recommendation system 166 can then generate recommendations for surfacing to various users. This is indicated by block 312. For instance, where it generates a recommendation indicating that an item of content should be associated with a topic board, it may surface that recommendation for the other users who are associated with the topic board. The same may be done for adding associations between other users and the topic board. This is an example only.

Figure 6:
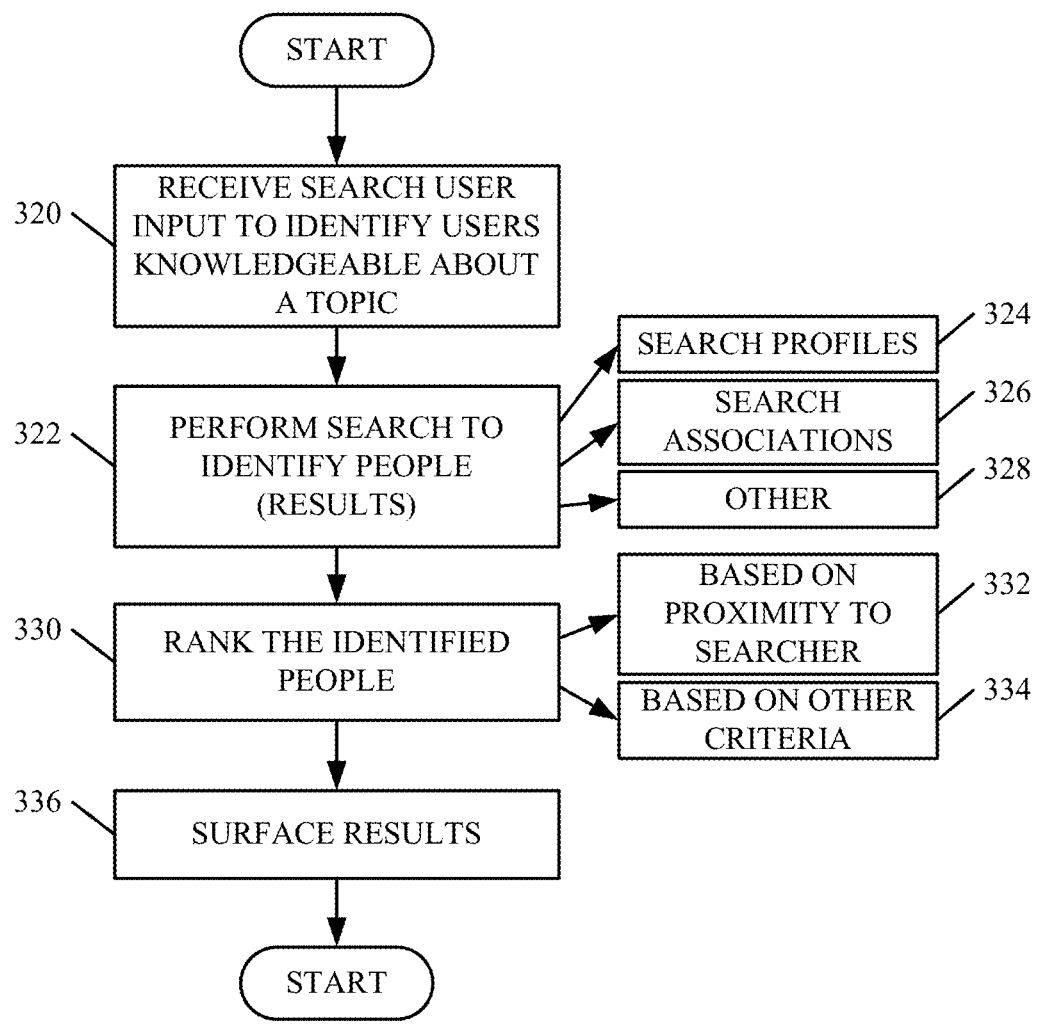
FIG. 6 is a flow diagram illustrating one example of the operation of a search system used to identify people knowledgeable about a topic area.

FIG. 6 is a flow diagram illustrating one example of the operation of search system 138. Search system 138 first receives a user search input indicating that the user wishes to identify another user or set of users knowledgeable about a topic. This can be a textual input, or another input. Search system 138 can parse the search input to perform keyword searching, it can perform natural language processing on the search input, or it can perform a variety of other processing to identify content in the search input, for which it is to search. Receiving the search user input to identify users knowledgeable about a topic is indicated by block 320 in FIG. 6.

Search system 138 then performs a search to identify those people (as search results). This is indicated by block 322. It can do so, for instance, by searching user profiles 182. This is indicated by block 324. It can search the user/content/topic associations 180, as indicated by block 326. It can search other items as well, as indicated by block 328.

Once persons relevant to the search input are identified, search system 138 illustratively ranks the identified people. This is indicated by block 330. For instance, they can be ranked based upon a physical proximity to the searcher that provided the search input. By way of example, a company may be a multi-national company with offices dispersed throughout the world. A searcher may be searching for someone who has knowledge about a particular topic area, and it may be advantageous to identify those people who are located in a close physical proximity to the searcher. Therefore, the profile information that identifies where a user is located can be used to rank the search results. This is indicated by block 332. Of course, search system 138 can rank the search results in a wide variety of other ways, using a wide variety of other ranking criteria. This is indicated by block 334.

Search system 138 then controls user interface component 128 to surface the search results. This is indicated by block 336. Again, this can be done in a wide variety of different ways, using a wide variety of different surfacing mechanisms.

It can thus be seen that the present system advantageously identifies associations between individuals and a topic board that represents a topic of interest or a subject matter. These associations are used to identify people that are knowledgeable about the topic area or subject matter, and to automatically update profile information corresponding to those people. This information can also be used to update associations (such as a node edge graph) in order to reflect the associations. The information can then advantageously be used in performing a search to identify users that have knowledge of a given area. This significantly increases the performance of the computing system in a variety of different ways. This information can be returned in response to a single search request, relatively quickly. Instead of a user needing to provide multiple different search requests to identify people with specific knowledge, this can be surfaced with one search request, or a very small number of search requests, because the user's profile information is automatically updated. This can save on network traffic and processing and memory overhead needed to perform searches. In addition, because the user profile information is automatically updated, this can be the source that is searched. Thus, instead of needing to search multiple different locations of multiple different sources of information, the search system need only search the user profile information, or the associations, or both. This also increases the performance of the system. Further, the present system increases the efficiency of the users. They need not perform multiple searches and spend a large amount of time to identify people with knowledge in a specific area. Instead, this can be done quickly, with relatively few user interactions. This increases efficiency as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
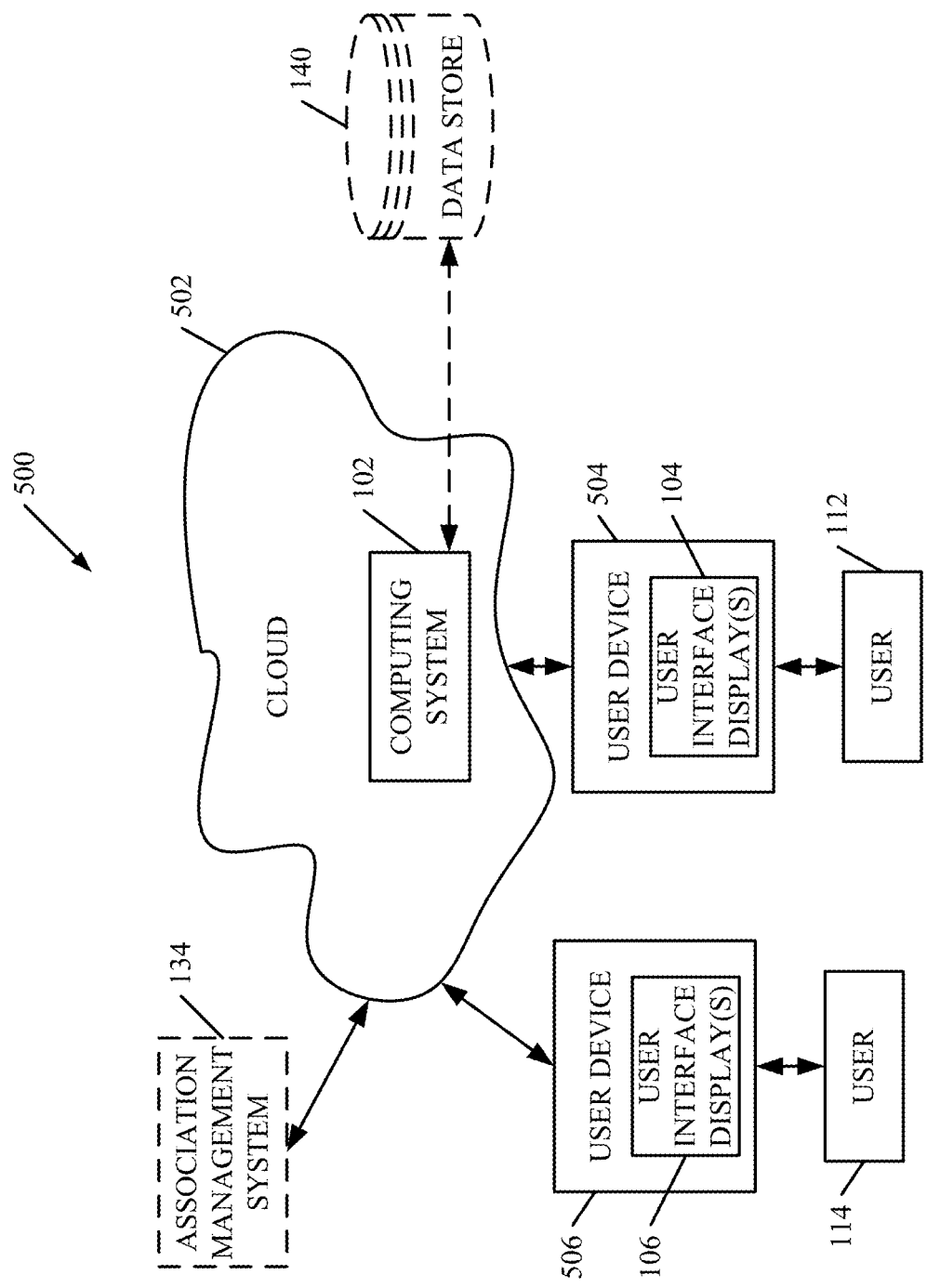
FIG. 7 is a block diagram of one example of the architecture shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that computing system 102 can be located in cloud 502 (which can be public, private, or a combination where portions are public while others are private). Therefore, users 112 and 114 uses user devices 504 and 506 to access those systems through cloud 502.

FIG. 7 also depicts another example of a cloud architecture. FIG. 7 shows that it is also contemplated that some elements of computer system 102 can be disposed in cloud 502 while others are not. By way of example, data store 140 can be disposed outside of cloud 502, and accessed through cloud 502. In another example, association management system 134 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
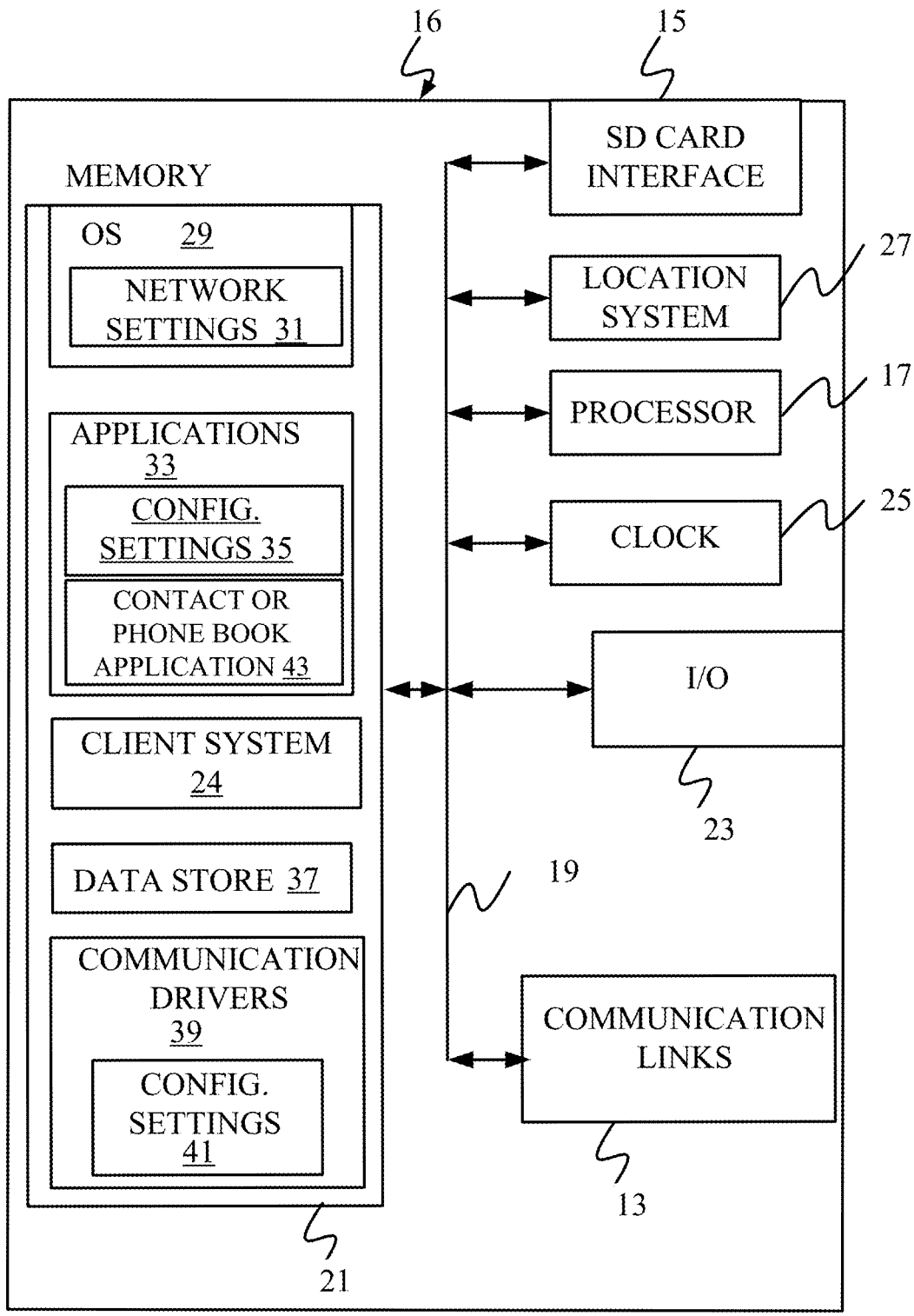
FIGS. 8-10 show examples of mobile devices that can be used in the architectures shown in previous figures.
Figure 9:
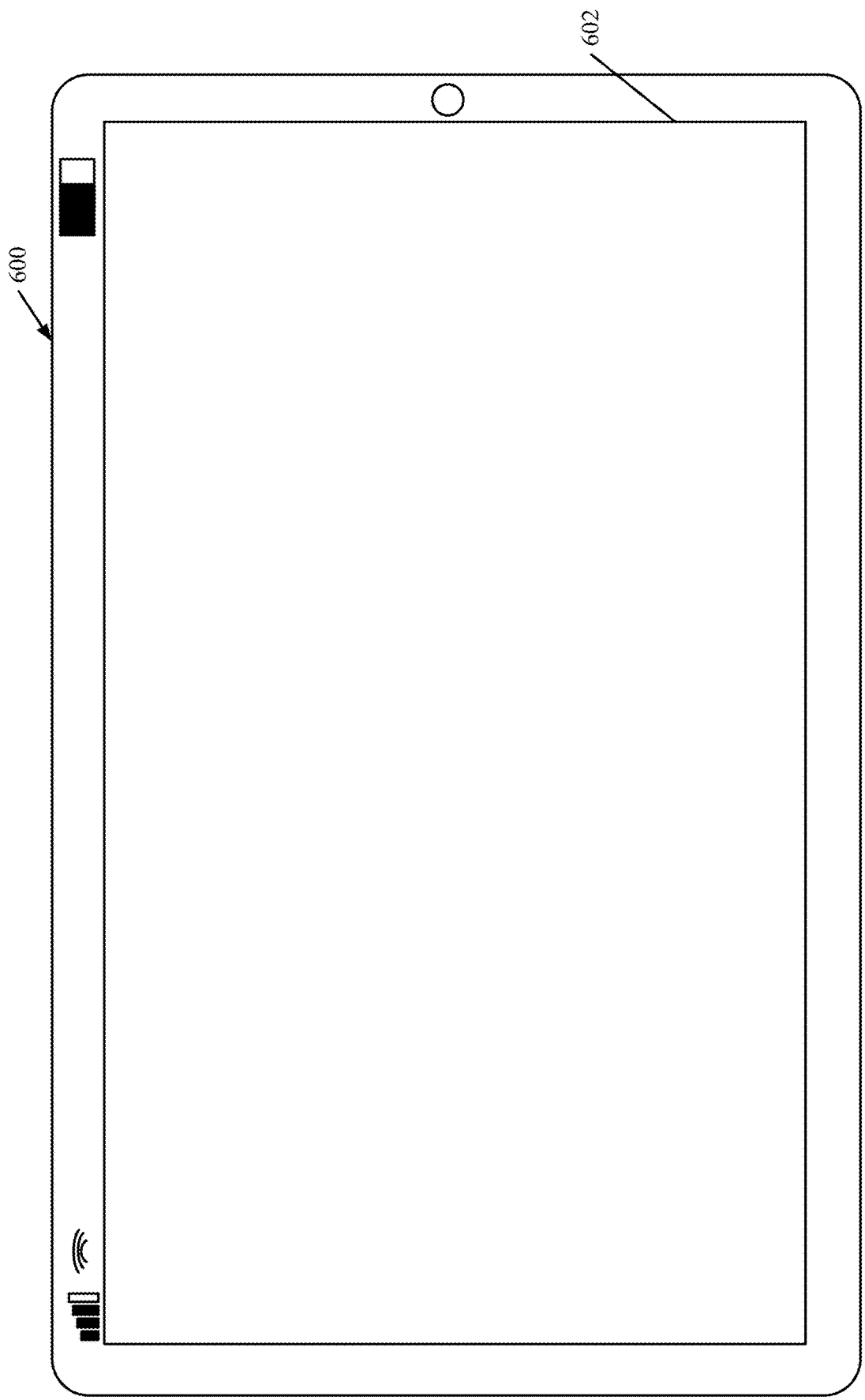
Figure 10:
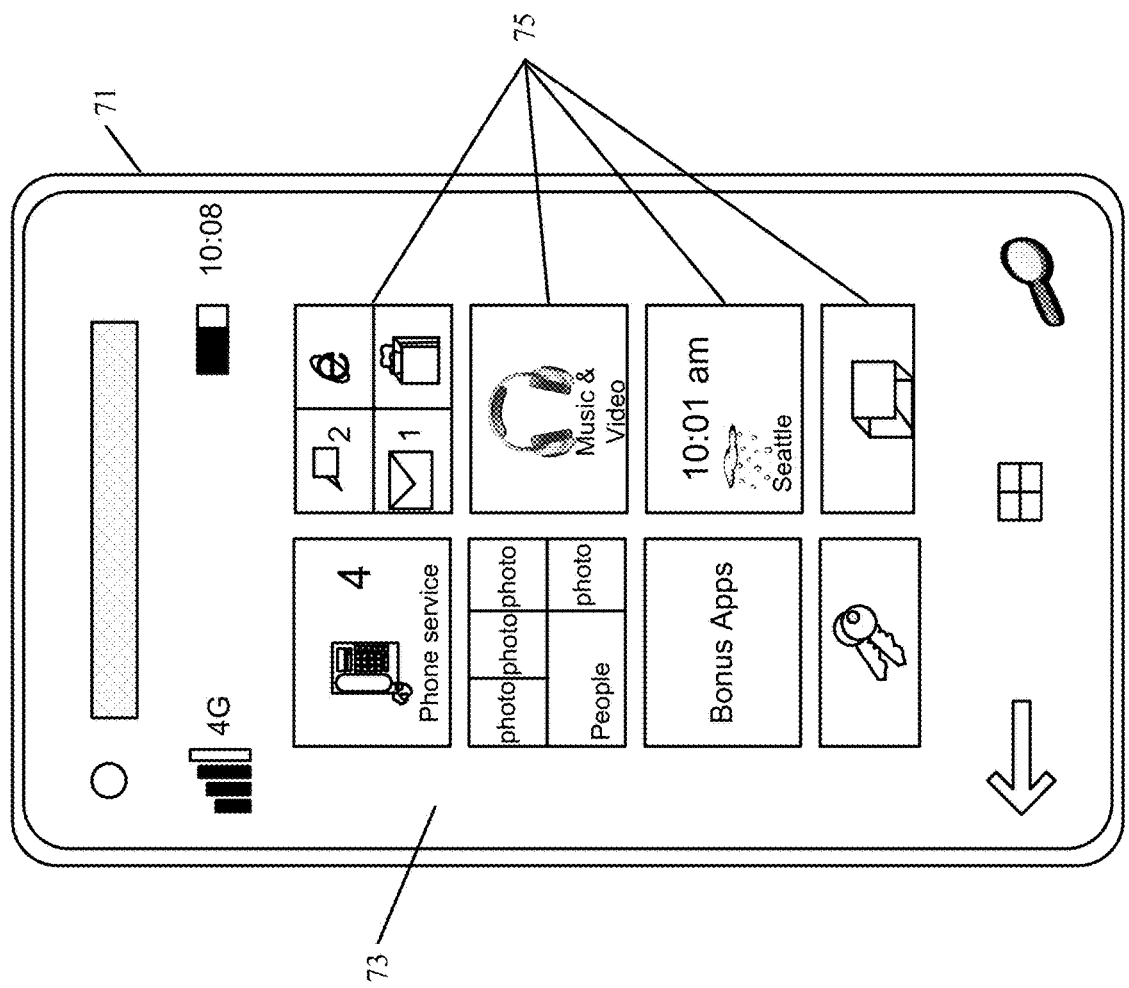

FIG. 8 is a simplified block diagram of one illustrative embodiment of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors from the previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. The device can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples, the, phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
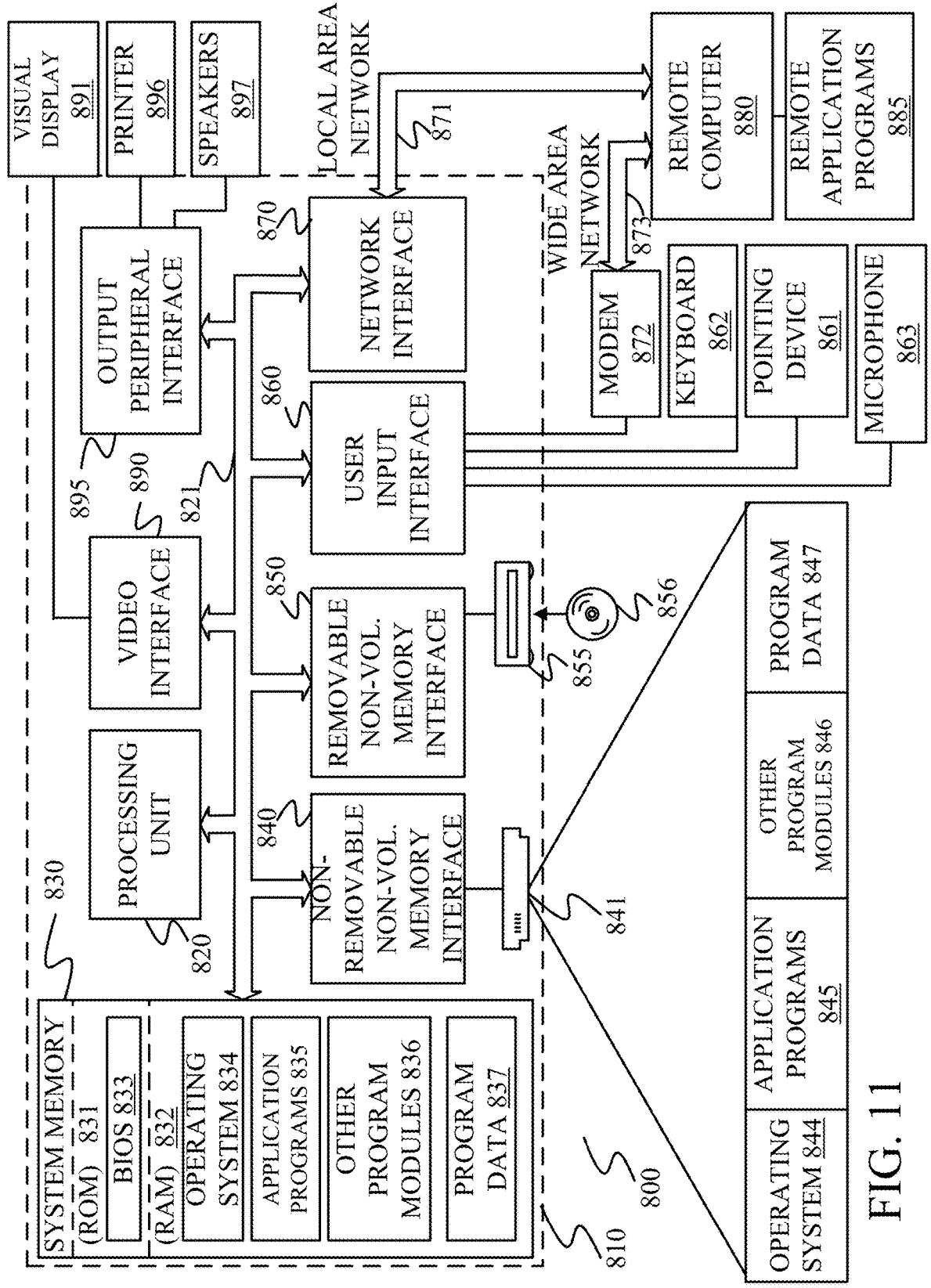
FIG. 11 is a block diagram of one example of a computing environment that can be deployed in the architectures shown in previous figures.

FIG. 11 is one embodiment of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a topic board management system that controls a user interface component to surface user input mechanisms and detects user interaction with the user input mechanisms to generate a topic board record corresponding to a subject matter area and add information to the topic board record;
a profile update system that identifies users corresponding to the detected user interactions and updates user profile records to identify that the identified users have a relation to the topic board record; and
a notification component that automatically communicates a notification to users, of the updated user profile records.

Example 2 is the computing system of any or all previous examples wherein the topic board management system comprises:
a content addition component that surfaces a content addition user input mechanism and detects user interaction with the content addition user input mechanism, and, in response, adds content to the topic board record.

Example 3 is the computing system of any or all previous examples wherein the profile update system detects a given user that actuated the content addition user input mechanism and added content to the topic board record and updates the user profile record for the given user to indicate that the given user has knowledge about the subject matter area corresponding to the topic board record.

Example 4 is the computing system of any or all previous examples wherein the topic board management system comprises:
a people addition component that surfaces a people addition user input mechanism and detects user interaction with the people addition user input mechanism, and, in response, adds an identified person to the topic board record.

Example 5 is the computing system of any or all previous examples wherein the profile update system detects a given user that actuated the people addition user input mechanism and added the identified person to the topic board record and, in response, updates the user profile record for the identified person to indicate that the identified person has knowledge about the subject matter area corresponding to the topic board record.

Example 6 is the computing system of any or all previous examples and further comprising:
a social collaboration system that detects when the identified person is added to the topic board record and, in response, notifies other users already in the topic board record, that the identified person has been added to the topic board record.

Example 7 is the computing system of any or all previous examples wherein the social collaboration system surfaces a moderation user input mechanism that can be actuated to provide a moderation input to remove the identified person from the topic board record.

Example 8 is the computing system of any or all previous examples wherein the profile update system updates the user profile records by entering an indicator that the identified users have a relation to the subject matter area corresponding to the topic board record.

Example 9 is the computing system of any or all previous examples and further comprising:
an association analysis system that accesses a set of user associations with content and user associations with topic areas and controls the profile update system to surface a recommended profile update user input mechanism that is actuated to automatically add a recommended profile update to a given user profile record, based on the set of user associations accessed.

Example 10 is the computing system of any or all previous examples and further comprising:
a search system that generates a search user input mechanism that is actuated to provide a search query identifying a topic of interest and to search the user profile records and return search results indicative of users knowledgeable about the topic of interest.

Example 11 is a computer implemented method, comprising:
controlling a user interface component to surface topic board management user input mechanisms,
detecting user interaction with the topic board management user input mechanisms;
in response, generating a topic board record corresponding to a subject matter area;
adding information to the topic board record;
identifying users corresponding to the detected user interactions;
updating user profile records to identify that the identified users have a relation to the topic board record; and
automatically communicating a notification to users, of the updated user profile records.

Example 12 is the computer implemented method of any or all previous examples wherein controlling the user interface component comprises:
controlling the user interface component to surface a content addition user input mechanism, wherein detecting user interaction comprises detecting user interaction with the content addition user input mechanism, and wherein adding information comprises adding content to the topic board record.

Example 13 is the computer implemented method of any or all previous examples wherein updating user profile records comprises:
detecting a given user that actuated the content addition user input mechanism and added content to the topic board record; and
updating the user profile record for the given user to indicate that the given user has knowledge about the subject matter area corresponding to the topic board record.

Example 14 is the computer implemented method of any or all previous examples wherein controlling the user interface component comprises:
controlling the user interface component to surface a people addition user input mechanism, wherein detecting comprises detecting user interaction with the people addition user input mechanism, and wherein adding information comprises adding an identified person to the topic board record.

Example 15 is the computer implemented method of any or all previous examples wherein updating the profile records comprises:
detecting a given user that actuated the people addition user input mechanism and added the identified person to the topic board record; and
updating the user profile record for the identified person to indicate that the identified person has knowledge about the subject matter area corresponding to the topic board record.

Example 16 is the computer implemented method of any or all previous examples and further comprising:
detecting when the identified person is added to the topic board record;
in response, notifying, through a social network, other users already in the topic board record, that the identified person has been added to the topic board record; and
surfacing a moderation user input mechanism, through the social network, that can be actuated to provide a moderation input to remove the identified person from the topic board record.

Example 17 is the computer implemented method of any or all previous examples and further comprising:
accessing a set of user associations with content and user associations with topic areas;
controlling the profile update system to surface a recommended profile update user input mechanism, indicative of a recommended profile update, based on the set of user associations accessed;
detecting actuation of the recommended update user input mechanism; and
automatically adding the recommended profile update to a given user profile record.

Example 18 is the computer implemented method of any or all previous examples and further comprising:
controlling the user interface component to generate a search user input mechanism;
detecting actuation of the search user input mechanism to receive a search query identifying a topic of interest;
searching the user profile records based on the search query; and
returning search results indicative of users knowledgeable about the topic of interest.

Example 19 is a computing system, comprising:
a topic board management system that surfaces user input mechanisms and detects user interaction with the user input mechanisms to generate a topic board record corresponding to a subject matter area and to add information to the topic board record;
a profile update system that identifies a user corresponding to the detected user interactions and updates a user profile record to identify that the identified user has a relation to the topic board record; and
a social collaboration system that detects when the identified user is added to the topic board record and, in response, notifies other users already in the topic board record, that the identified user has been added to the topic board record.

Example 20 is the computing system of any or all previous examples wherein the topic board management system comprises:
a content addition component that surfaces a content addition user input mechanism and detects user interaction with the content addition user input mechanism, and, in response, adds content to the topic board record, wherein the profile update system detects a given user that actuated the content addition user input mechanism and added content to the topic board record and updates the user profile record for the given user to indicate that the given user has knowledge about the subject matter area corresponding to the topic board record; and
a people addition component that surfaces a people addition user input mechanism and detects user interaction with the people addition user input mechanism, and, in response, adds an identified person to the topic board record, wherein the profile update system detects a given user that actuated the people addition user input mechanism and added the identified person to the topic board record and, in response, updates the user profile record for the identified person to indicate that the identified person has knowledge about the subject matter area corresponding to the topic board record.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions which, when executed, configure the computing system to:
generate a node-edge graph that models entities as nodes and relationships between the entities as connections between nodes, wherein the entities modeled by the node-edge graph comprise:
a set of topic board records, each topic board record representing a corresponding topic board and including associated content and users, and
a plurality of users represented by user profiles associated with the computing system, each user profile storing information associated with a particular one of the users;
generate a topic board user interface display that:
represents a particular one of the topic board records that corresponds to a subject matter area;
provides collaboration functionality that facilitates collaboration on the particular topic board record by the plurality of users, and
includes a content addition user input control configured to receive user input from a first user to add content to the particular topic board record;
crawl the node-edge graph to identify a set of associations to a second user;
weight the set of associations based on a weighting criterion;
generate a recommendation to add the second user as a user to add to the particular topic board record based on the weighted set of associations; and
automatically update a user profile record, that corresponds to the second user, by adding an indicator to the particular user profile record indicating that the second user has a relation to the subject matter area corresponding to the particular topic board record.

2. The computing system of claim 1, wherein the instructions configure the computing system to:
generate a search user input control;
based on actuation of the search user input control, search the plurality of user profile records based on a search query identifying a topic of interest; and
return search results, based on the search, indicative of one or more users being associated with the topic of interest.

3. The computing system of claim 2, wherein the indicator, added to the second user profile record that corresponds to the second user, identifies that the second user has knowledge about the subject matter area corresponding to the particular topic board record.

4. The computing system of claim 1, wherein the instructions configure the computing system to:
generate a people addition user input control that represents the second user as a recommended user to add to the particular topic board record, and
based on an indication of user interaction with the people addition user input control, add the second user to the particular topic board record.

5. The computing system of claim 1, wherein the instructions configure the computing system to:
identify the second user based on transitive closures of graph edges within the node-edge graph.

6. The computing system of claim 1, wherein the instructions configure the computing system to:
determine when the second user is added to the particular topic board record and, in response, notify other users already in the particular topic board record, that the second user has been added to the particular topic board record.

7. The computing system of claim 6, wherein the instructions configure the computing system to:
generate a moderation user input control, and
based on an indication of user actuation of the moderation user input control, remove the second user from the particular topic board record.

8. The computing system of claim 7, wherein the instructions configure the computing system to:
update the user profile records by entering an indicator that the other users have a relation to the subject matter area corresponding to the particular topic board record.

9. The computing system of claim 8, wherein the instructions configure the computing system to:
access a set of user associations with content and user associations with topic areas,
control the profile update system to generate a recommended profile update user input control, and
based on an indication of user actuation of the recommendation profile update user input control, automatically add a recommended profile update to a given user profile record, based on the set of user associations.

10. A computer implemented method, comprising:
accessing a node-edge graph that models entities as nodes and relationships between the entities as connections between nodes, wherein the entities modeled by the node-edge graph comprise:
a set of topic board records, each topic board record representing a corresponding topic board and including associated content and users, and
a plurality of users represented by user profiles, each user profile storing information associated with a particular one of the users;
generating a topic board interface that:
represents a particular one of the topic board records,
provides collaboration functionality that facilitates collaboration on the particular topic board record by the plurality of users,
includes a content addition user input control, and
includes a people addition user input control;
based on an indication of user input from a first user through the content addition user input control, adding content to the particular topic board record; and
automatically updating a first user profile record, that corresponds to the first user, by adding an indicator to the first user profile record indicating that the first user has a relation to a subject matter area corresponding to the particular topic board record;
crawling the node-edge graph to identify a set of associations to a second user;
weighting the set of associations based on a weighting criterion;
generating a recommendation to add the second user to the particular topic board record based on the weighted set of associations;
based on an indication of user interaction with the people addition user input control, adding an indication of the second user to the particular topic board record; and
updating a second user profile record for the second user to indicate that the second user has a relation to the subject matter area corresponding to the particular topic board record.

11. The computer implemented method of claim 10, wherein the indicator identifies the subject matter area and identifies that the first user has knowledge about the subject matter area corresponding to the particular topic board record.

12. The computer implemented method of claim 10, wherein updating the user profile record comprises:
   updating the second user profile record for the second user to indicate that the second user has knowledge about the subject matter area corresponding to the particular topic board record.

13. The computer implemented method of claim 12, and further comprising:
   detecting when the second user is added to the particular topic board record;
   in response, notifying, through a social network, other users already in the particular topic board record, that the second user has been added to the particular topic board record;
   generating a moderation user input control, through the social network; and
   based on an indication of user actuation of the moderation user input control, removing the indication of the second user from the particular topic board record.

14. The computer implemented method of claim 13, and further comprising:
   generating a search user input control;
   based on an indication of user actuation of the search user input control, searching the plurality of user profile records based on a search query that identifies a topic of interest; and
   returning search results, based on the search, indicative of one or more users being associated with the topic of interest.

* * * * *